United States Patent Office 3,499,826
Patented Mar. 10, 1970

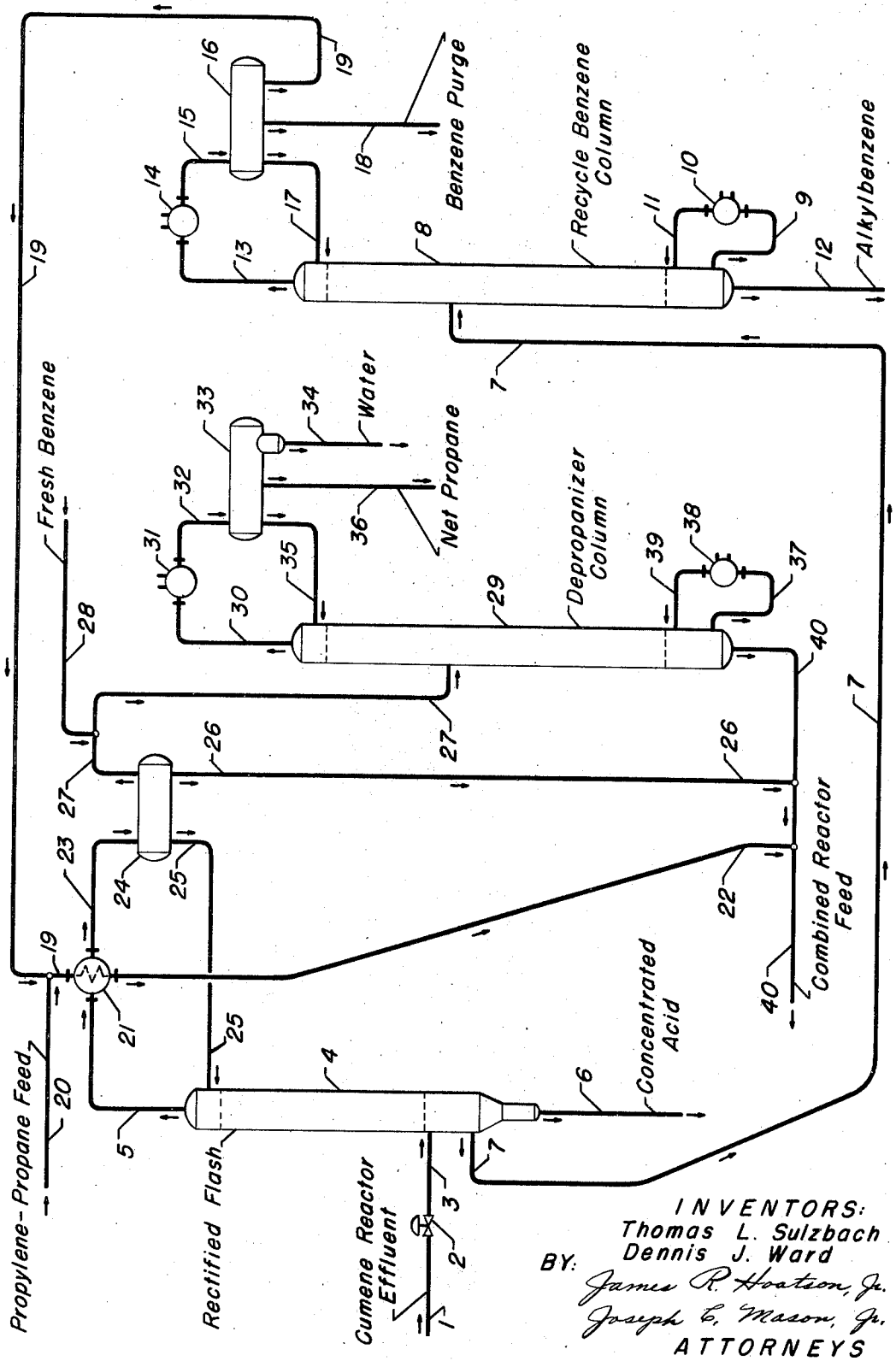

3,499,826
SEPARATION PROCESS FOR AROMATIC ALKYLATION EFFLUENT BY FLASH DISTILLATION AND PARTIAL CONDENSATION
Thomas L. Sulzbach, Elk Grove Village, and Dennis J. Ward, Lombard, Ill. (both of 30 Algonquin Road, Des Plaines, Ill. 60016)
Filed Apr. 15, 1968, Ser. No. 721,444
Int. Cl. B01d 3/06
U.S. Cl. 203—27                                6 Claims

ABSTRACT OF THE DISCLOSURE

Separation process for a reaction zone effluent containing at least three components, such as an aromatic alkylation reaction zone effluent. The effluent is passed into a rectified flash zone under conditions sufficient to provide a first fraction comprising diluent and alkylatable aromatic compound and a second fraction comprising alkylatable aromatic compound and alkylated aromatic compound. The first fraction is passed to a partial condensing zone under conditions sufficient to provide a vapor fraction rich in diluent and containing alkylatable aromatic compound, and a condensate fraction rich in alkylatable aromatic compound and containing diluent. The vapor fraction is separated to provide a diluent fraction and a third fraction comprising diluent and alkylatable aromatic compound. The second fraction is separated to provide a fourth fraction comprising alkylatable aromatic compound and a fifth fraction containing alkylated aromatic compound. The fifth fraction is recovered, while the third, fourth, and condensate fractions are returned to the reaction zone. The process is equally effective in the separation of the effluent from an oligomerization reaction zone. Specific application of the process is in the synthesis of ethylbenzene, cumene, heptene, propylene-trimer, and propylene-tetramer.

FIELD OF INVENTION

The present invention relates to a separation process for recovery of product from a reaction zone effluent containing at least three components. The present invention particularly relates to the separation of the effluent from an alkylation reaction zone to provide a diluent for return to the reaction zone, a reactant for return to the reaction zone, and a product stream of alkylated aromatic compound. The inventive process also relates to the separation of the effluent from an oligomerization reaction zone to provide a diluent for return to the reaction zone, a stream of partially-oligomerized product for return to the reaction zone, and a product stream of oligomerized product. Most particularly, the present invention relates to a method of separation which results in an improved process for alkylation of benzene with an ethylene-ethane mixture, for alkylation of benzene with a propylene-propane mixture, for the oligomerization of propylene in a propylene-propane mixture, and for the co-oligomerization of propylene and butene in a reactive mixture containing propane and butane.

The present invention finds one broad application in the production of alkylated aromatic hydrocarbons for use in subsequent chemical synthesis. The present invention particularly finds application in the production of isopropylbenzene, or cumene, which is utilized in the synthesis of phenol, acetone, alpha-methylstyrene, and acetophenone. These cumene-derived chemicals are intermediates in the synthesis of resins for plastics and nylon. A further application of the inventive process is in the synthesis of ethylbenzene. Virtually all of the ethylbenzene commercially produced is dehydrogenated to styrene monomer, although small quantities are used as solvents and as intermediates in the synthesis of other chemicals. Ethylbenzene-derived styrene finds utility in the synthesis of polyester resins, polystyrene and other plastics, as well as in the synthesis of styrene-butadiene rubber and in the formulation of coatings including latex paints.

Application of the inventive process may also be found in the alkylation of substituted aromatics such as phenol, which when alkylated with isobutylenes forms O-tertiarybutylphenol which is an intermediate in the synthesis of other chemicals, and forms p-tertiarybutylphenol which is used to modify phenolformaldehyde resins. A further application of the inventive process upon substituted aromatic hydrocarbons may be found in the alkylation of para-hydroxyanisole with tertiary butyl alcohol or isobutylene to form butylated hydroxyanisole which finds utility as an antioxidant in the preservation of foods.

The present invention finds additional application in the oligomerization of olefin-acting compounds. Oligomerization of propylene may be undertaken to produce commercial fractions of propylene-trimer and proylene-tetramer, within the scope of the inventive process. Trimer finds utility in the synthesis of nonyl-phenol detergents and in the synthesis of decyl alcohols by the oxo process. Tetramer is also used in the synthesis of detergents. The inventive process also finds application in the synthesis of commercial fractions of heptene which are produced by the co-oligomerization of propylene and butenes in a reaction mixture comprising propylene, propane, butene, and butane. Heptene is utilized in this synthesis of octyl alcohols by the oxo process. (It is to be noted that obligomerization of olefin hydrocarbons is more commonly referred to as "polymerization of olefins" in the petroleum refining industry.)

DESCRIPTION OF THE PRIOR ART

As indicated above, the present invention particularly relates to the recovery of isopropylbenzene, or cumene, from an alkylation reaction effluent. In the commercial manufacture of cumene it is the art to charge benzene and propylene into a reactor containing a solid phosphoric acid catalyst.

Because it is desired to minimize the dialkyation of benzene which produces di-isopropylbenzene by-product, it is the art to have a molar deficiency of propylene in the reaction zone and normally this deficiency is provided by maintaining the ratio of benzene to propylene at about 8:1. The resulting alkylation effluent which leaves the reaction zone will therefore contain about seven moles of unreacted benzene per mole of product cumene, and the excess benzene must be separated from the effluent and recycled to the reaction zone in conjunction with the fresh benzene feed which is charged to the process.

The propylene reactant which is typically charged to the process will contain unreactive diluent comprising propane with traces of ethane and butane. When the propylene feed is derived from a pyrolysis plant these diluents will normally be less than 10 mole percent, while a propylene feed derived from the gas recovery unit of a fluid catalytic cracking plant will often contain as much as 35 to 40 mole percent of unreactive diluents. In addition to the unreactive propane diluent which is inherent in the propylene feed, it is typically the art to introduce additional propane diluent into the reaction zone to provide a thermal quench for the exothermic alkylation reaction in order that the catalyst temperature may be controlled at the desired level. This propane quench may be introduced into the reactor at elevated temperature with the propylene-propane fresh feed, or it may be introduced at elevated temperature or at ambient temperature into the reaction zone at several intermediate quench points between several catalyst beds. The alkylation effluent which leaves the typical reaction zone therefore contains a considerable amount of propane diluent. This diluent must be separated from the effluent in order that a portion may be recycled to the reaction zone and in order that a quantity may be withdrawn from the process. The quantity withdrawn is equivalent to the quantity which is being introduced into the process in the propylene-propane feed, and it must be withdrawn from the process in order to avoid accumulation of unreactive diluents in the process unit.

It is the art in the manufacture of cumene to charge the alkylation effluent to a fractionation train comprising a depropanizer column, a benzene column, and a cumene column. The effluent enters the depropanizer wherein the propane diluent is removed overhead to provide the propane recycle stream for return to the reaction zone and a net propane product stream which is normally withdrawn to the fuel gas system or sent to product storage as liquefied petroleum gas (LPG). The bottoms liquid from the depropanizer passes into the benzene column which produces a benzene overhead stream. Part of the benzene produced provides the required recycle to the reaction zone and a second part is withdrawn from the process in order to avoid the accumulation of non-aromatic contaminants which enter the process as trace constituents in the benzene feed. The benzene column bottoms stream passes to a cumene column which produces an overhead comprising high purity cumene product and a bottoms by-product comprising polyalkylated benzene.

In the typical oligomerization process, an olefin-acting compound is oligomerized in the presence of an unreactive diluent to produce a desired oligomerized product and partially-oligomerized product which must be separated therefrom. For example, in the production of propylene-tetramer a typical propylene-propane feed is oligomerized over a solid phosphoric acid catalyst to produce a reactor effluent usually comprising propane, propylene - dimer, propylene - trimer, propylene - tetramer, and propylene-pentamer. It is therefore necessary to depropanize the reactor effluent in order to provide a recycle diluent propane stream for catalyst temperature control and to recycle the propylene-dimer and propylene-trimer to the reaction zone for further oligomerization with propylene to produce additional product propylene-tetramer. It is well known to those skilled in the art, that the required separation of the reactor effluent is accomplished by passing the effluent into a series of fractionating columns comprising a depropanizer column, a column for obtaining the desired recycle fraction of partially-oligomerized product, and a column for recovery of the desired oligomerized product.

A similar series of fractionating columns is normally utilized in the separation of the reactor effluent resulting from the synthesis of heptene by co-oligomerization of propylene and butenes. The unreactive diluent which must be recycled to the reactor for temperature control normally comprises a mixture of propane and butane. Because the olefinic feed contains propylene, butenes, and possible traces of other olefins, the reactor effluent will contain hexenes, heptenes, octenes, and heavier oligomerization products. It is the art to recover heptenes and octenes as the product fraction and to recycle hexenes and lighter olefins for additional oligomerization.

SUMMARY OF THE INVENTION

It is an object of the present invention to provide a method for the separation of a process stream containing at least three components. It is a further object of the present invention to provide a process for the separation of a reaction zone effluent. It is a particular object of the present invention to provide a separation process for the recovery of alkylated aromatic compounds from the effluent of an alkylation reaction zone and for the recovery of oligomerized products from the effluent of an oligomerization reaction zone. It is a specific object of this invention to produce ethylbenzene, cumene, heptene, propylene-trimer, and propylene-tetramer in a more economical and facile manner.

These and other objectives will be readily ascertained from the following description and the attached drawing which is a simplified flow diagram setting forth one specific embodiment of the invention.

In accordance with these objectives, a broad embodiment of this invention may be characterized as a process for separating an organic chemical mixture which comprises passing the mixture into a rectified flash zone maintained under separation conditions; withdrawing from the rectified flash zone a first vapor fraction and a bottoms liquid fraction; passing the first vapor fraction into a partial condensing zone maintained under separation conditions; withdrawing from the partial condensing zone a second vapor fraction and a condensate fraction; passing at least a portion of the condensate fraction into the rectified flash zone; and recovering at least a portion of the second vapor fraction, and at least a portion of the bottoms liquid fraction.

A more particular embodiment of the present invention may be chracterized as a process for separating a reaction zone effluent containing at least three components which comprises passing the effluent from a reaction zone into a rectified flash zone maintained under separation conditions; withdrawing from the rectified flash zone a first fraction comprising a first component and a first part of a second component, and a second fraction comprising a second part of second component and a third component; passing the first fraction into a partial condensing zone maintained under separation conditions; withdrawing from the partial condensing zone a third fraction comprising first component and second component, and a fourth fraction comprising second component; passing the third fraction into a first separation zone maintained under separation conditions; withdrawing from the first separation zone a fourth fraction comprising first component and a fifth fraction comprising second component; passing the second fraction into a second separation zone maintained under separation conditions; withdrawing from the second separation zone a sixth fraction comprising second component, and a seventh fraction comprising third component in high concentration; passing the fourth fraction and the fifth fraction into the reaction zone; and recovering the seventh fraction.

A preferred embodiment of the present invention may be characterized by this separation process wherein the reaction zone comprises an alkylation reaction zone, the first component comprises an unreactive diluent, the second component comprises an alkylatable aromatic compound, and the third component comprises an alkylated aromatic compound.

A further preferred embodiment of the present invention may be characterized by this separation process wherein the reaction zone comprises an oligomerization reaction zone, the first component comprises an unreactive diluent, the second component comprises partially-oligomerized product, and the third component comprises oligomerized product.

In a more specific embodiment of the inventive process as defined in the last three embodiments above, at least a part of the sixth fraction is passed into the reaction zone.

These and other more specific embodiments will be more clearly set forth hereinafter.

An understanding of the present invention may now be readily obtained by referring to the accompanying drawing which sets forth a simplified flow for carrying out one specific example wherein the process of the present invention is practiced.

DRAWING AND EXAMPLE

As previously noted, the particularly preferred embodiment of this invention comprises the inventive process wherein the alkylatable aromatic compound is benzene, the olefin-acting alkylating agent is propylene, the unreactive diluent is propane, and the desired mono-alkylated aromatic compound is high purity cumene. Referring now to the drawing, propylene is reacted with benzene over a solid phosphoric acid catalyst in a reaction zone, not shown, under alkylation reaction conditions.

The resulting cumene reactor effluent enters the separation process of the present invention via line 1 at a rate of 3972.5 mols/hr., at a presure of 500 p.s.i.g., and at a temperature of 435° F. (As used herein, mols/hr. refers to pound moles per hour.) The effluent comprising propane, benzene, cumene, and heavy alkylbenzenes passes through a pressure reduction valve 2 and enters a rectified flash column 4 via line 3 wherein the effluent is flashed at a pressure of 250 p.s.i.g. and a flash temperature of 385° F. The effluent enters the rectified flashed column 4 at a lower locus below a series of typical fractionation trays wherein the hot vapor produced by the flashing is rectified. A rectified vapor comprising propane and benzene is withdrawn from the top of the rectified flash column 4 via line 5 and further processed in a manner which will be set forth hereinafter. The remaining hot liquid portion of the flashed effluent is accumulated at the bottom of rectified flash column 4 via line 6. This liquid comprises a concentrated aqueous solution of phosphoric acid which is leached off of the solid phosphoric acid catalyst in the reaction zone. This stream normally amounts to about one gallon per day of concentrated phosphoric acid and is sent to a disposal system, not shown. The less dense phase comprising the major portion of the total liquid is removed from rectified flash column 4 via line 7 at a rate of 2397.3 mols/hr. This less dense liquid consists of unvaporized hydrocarbon constituents of the reactor effluent comprising benzene and substantially all of the alkylated benzene of the reactor effluent while having substantial freedom from propane.

The liquid hydrocarbon fraction is withdrawn from rectified flash column 4 via line 7 at a temperature of 385° F. and a pressure of 250 p.s.i.g. The liquid is passed through a control valve, not shown, and introduced into a recycle benzene column 8 via line 7 at a temperature of 253° F. and a pressure of 25 p.s.i.g. Recycle benzene column 8 is maintained under conditions sufficient to separate the unreacted benzene from the alkylated benzene products of the effluent. Column 8 is provided with a typical reboiler circuit. A portion of the liquid in the bottom of recycle benzene column 8 passes into reboiler 10 via line 9 at a temperature of 386° F. The liquid is reboiled therein and passes back to column 8 via line 11 at a temperature of 389° F. A final alkylbenzene product stream having substantial freedom from benzene is withdrawn via line 10 at a temperature of 386° F. The alkylbenzene product is sent to a subsequent cumene fractionation column, not shown, at a rate of 334.0 mols/hr. The cumene column separates the alkylbenzene to provide 315.7 mols/hr. of high purity cumene product and 18.3 mols/hr. of heavy alkylbenzene by-product.

A vapor fraction is withdrawn from the top of recycle benzene column 8 via line 13 at a rate of 4460.6 mols/hr. The benzene vapor enters condenser 14 at 235° F. and at 20 p.s.i.g. wherein it is condensed and cooled. The condensed benzene passes from condenser 14 via line 15 into receiver 16 at a temperature of 130° F. and a pressure of 17 p.s.i.g. The benzene is withdrawn in three portions from receiver 16. A first portion is passed back to recycle benzene column 8 via line 17 at a rate of 2397.3 mols/hr. to provide the reflux therein. A second portion is withdrawn via line 18 at a rate of 100 mols/hr. as a benzene purge stream which is sent to a benzene recovery system, not shown. The benzene purge stream is typical in the art and is necessary in order to avoid the accumulation of unreactive hydrocarbon constituents within the aromatic alkylation process. The unreactive constituents normally enter the inventive process as trace contaminants in the fresh benzene feed. A third portion of the liquid benzene is withdrawn from receiver 16 via line 19 at a rate of 1963.3 mols/hr. and at a temperature of 130° F., and returned to the reaction zone in the preferred manner hereinafter described.

The third portion of the benzene is pumped, by means not shown to a pressure of 580 p.s.i.g. and passed via line 19 to a junction wherein fresh propylene-propane feed is introduced into line 19 via line 20. The propylene-propane feed provides the reactive propylene which is consumed within the reaction zone to produce the desired cumene product. The propylene-propane feed has a purity of 65.7 mole percent propylene and enters line 19 via line 20 at a rate of 536.4 mols/hr., at a temperature of 100° F., and a pressure of 580 p.s.i.g. The resulting mixture of benzene, propylene, and propane flows via line 19 into partial condenser 21 at a rate of 2499.7 mols/hr. and a temperature of 120° F. The stream is heated in partial condenser 21 by heat exchange with the previously described hot vapor which leaves the top of rectified flash column 4 via line 5. The heated stream is withdrawn from partial condenser 21 via line 22 at a temperature of 326° F. and a pressure of 560 p.s.i.g. The hot combined feed stream is returned to the reaction zone in a manner which will be set forth hereinafter.

The hot vapor which is flashed from the cumene reactor effluent upon entry of the effluent into rectified flash column 4 flows up through the fractionation decks in the upper region of the rectified flash column wherein it is contacted with downflowing relatively cool liquid in order to remove substantially all alkylbenzene from the vapor phase. The vapor is withdrawn from the top of rectified flash column 4 via line 5 at a rate of 2003.4 mols/hr. The vapor comprises substantially all of the propane contained in the reactor effluent and has substantial freedom from alkylbenzene, but it contains a considerable amount of benzene vapor. The vapor enters partial condenser 21 via line 5 at a temperature of 366° F. and a pressure of 250 p.s.i.g. As noted hereinabove, the combined propylene-propane and benzene stream of line 19 provides the cooling medium within partial condenser 21. This vapor is partially condensed therein and cooled before passing into receiver 24 via line 23 at a temperature of 259° F. and a pressure of 240 p.s.i.g.

Receiver 24 separates the condensed liquid from the cooled vapor. A first portion of the liquid is withdrawn via line 25 at a rate of 428.2 mols/hr. and is returned to the top of rectified flash column 4 at a temperature of 259° F. to provide the reflux for rectification therein. A second portion of the liquid hydrocarbon is withdrawn via line 26 at a temperature of 259° F. and at a rate of 1376.0 mols/hr. The stream comprises benzene and propane and is preferably returned to the reaction zone in a manner which will be set forth hereinafter.

A hot vapor leaves separator 24 via line 27 at the rate of 199.2 mols/hr., at a temperature of 259° F., and at a pressure of 240 p.s.i.g. This vapor, which is rich in propane and which contains benzene, is mixed with a fresh benzene feed which is introduced into line 27 via line 28 at a rate of 428.2 mols/hr. and a temperature of 230° F. This fresh benzene feed provides the aromatic reactant which is subsequently consumed in the alkylation reaction zone to produce the desired cumene product. The fresh benzene contains traces of water and is typically introduced into the separation zone of the aromatic alkylation unit rather than being introduced directly into the reactor vessel since excessive amounts of water are detrimental to the solid phosphoric acid catalyst which is contained therein. It is, therefore, typical in the art to introduce the fresh benzene reactant into the aromatic alkylation unit rather than being introduced directly may be suitably dried prior to its introduction into the alkylation reaction zone and its contact with the solid phosphoric acid catalyst.

The resulting mixture of propane and benzene passes into a depropanizer column 29 via line 27 at a rate of 627.4 mols/hr. and a temperature of 240° F. The depropanizer column 29 is operated under conditions sufficient to produce a propane overhead product which is substantially free of benzene and other normally liquid hydrocarbon constituents. The propane vapor is withdrawn from depropanizer column 29 via line 30 at a rate of 978.0 mols/hr., at a temperature of 116°F., and at a pressure of 235 p.s.i.g. The vapor is introduced into condenser 31 wherein it is condensed and cooled to 100° F. before passing into separator 33 via line 32.

The condensed liquid is separated within separator 33 into an aqueous phase and a hydrocarbon phase comprising propane substantially free of benzene and heavier hydrocarbons. This aqueous phase results from traces of water which have been introduced into the process in the fresh benzene which enters the system via line 28. The accumulation of this trace water is withdrawn from separator 33 via line 34 and sent to disposal, not shown. A part of the hydrocarbon fraction which is accumulated in receiver 33 is withdrawn therefrom via line 35 and returned to depropanizer column 29 at a rate of 800.0 mols/hr. and a temperature of 100° F. to provide the reflux therein. A second portion of the propane liquid is withdrawn from settler 33 via line 36 at a rate of 178.0 mols/hr. The net propane product is equivalent to the unreactive constituents which enter the inventive process in the propylene-propane feed at line 20 and it may be sent to LPG product storage or to a fuel gas system.

Depropanizer column 29 is provided with the typical reboiler circuit. A portion of the bottoms liquid is withdrawn from column 29 via line 37 and enters reboiler 38 at 235° F. and 245 p.s.i.g. The liquid is reboiled therein and returned to depropanizer column 29 via line 39 at a temperature of 265° F.

A bottoms liquid is withdrawn from depropanizer 29 via line 40 at 265° F. and at a rate of 449.4 mols/hr. This stream comprising propane diluent and benzene is returned to the reactor section. The previously mentioned hydrocarbon stream comprising propane and benzene in line 26 is introduced into line 40, and the previously mentioned hydrocarbon stream comprising propylene, propane, and benzene is introduced via line 22 into line 40. A final resulting combined reactor feed is sent to the alkylation reaction zone, not shown, via line 40 at a rate of 4325.1 mols/hr., at a temperature of 326° F., and at a pressure of 560 p.s.i.g. The combined reactor feed upon reaction over the solid phosphoric acid catalyst contained in the reaction zone produces the cumene reactor effluent which enters the inventive process via line 1, and which is separated in the manner which has been described hereinabove.

PREFERRED EMBODIMENTS

Several important advantages of the inventive process may be readily ascertained from the foregoing process description.

The first advantage which will be readily seen is that the depropanizer column of the inventive process is substantially reduced in size. Whereas the total reactor effluent of 3972.5 moles per hour would be charged to the column under the prior art, in the present invention only 627.4 moles per hour is fed to the column. More than half of the benzene, and all of the alkylbenzene of the effluent by-passes the column as the flash liquid in line 7. In addition, none of the propane recycle passes through the column as an overhead vapor product on its return to the reaction zone. The column diameter may be significantly reduced overhead vapor loading, and the overhead condensing system and the reboiler system are accordingly reduced in size. The net result is that the present invention yields a considerable savings in the capital cost of the depropanizer fractionator.

There is also a reduction of operating cost for the cumene plant due to the reduction of utilities which are required at the depropanizer column. Since more than half of the benzene and all alkylbenzene by-passes the column, the sensible heat otherwise required to elevate the flash liquid to the reboiler temperature is saved. In addition, there is a considerable saving of heat input at the depropanizer because the recycle propane does not pass through the column as an overhead vapor product. If the propane recycles to the reactor were the typical overhead vapor product, a considerable addition of reflux would be required in order to make high purity propane recycle since the net propane product which leaves the column via line 36 must be benzene-free for use as fuel gas or LPG. The propane recycle may be allowed to contain considerable amounts of benzene, however, since it is also necessary to return benzene to the alkylation reactor. If the propane recycle is an overhead product of the depropanizer, it is forced to meet the purity specification of the product propane, thus adding reflux and utilities expense with no beneficial result to the process. The present invention eliminates this wasteful utility cost.

There are similar savings in the capital cost and utility expenses to be realized at the benzene column. It will be seen that about half of the benzene recycle is returned to the alkylation reactor as a hot condensate from receiver 24 or as a hot bottoms from the depropanizer column. This results in a reduced loading at the recycle benzene column for not only is the feed reduced but the amount of reflux is reduced accordingly. Thus, the column diameter, overhead condensing system, reboiler system, and other auxiliary equipment may be significantly reduced due to the reduced column loading. Not only is capital cost reduced for this equipment, but utilities expense for operating the recycle benzene column is also reduced.

There is an additional savings in utility expenses by the manner by which the recycle benzene is processed in the inventive process. The recycle benzene which must be returned to the reaction zone must be heated to reaction temperature. A part of this heating is accomplished by passing the cold benzene recycle in line 19 through partial condenser 21. Not only is the cold benzene heated to 326° F. by this system, but it provides the cooling medium for the exchanger and thus reduces cooling water requirements for the cumene plant. In addition, about half of the benzene recycle as the hot condensate from receiver 24 or the hot bottoms from the depropanizer. Since this portion of the benzene recycle is not cooled as in the prior art processing methods, a considerable savings in preheating expense results.

Similarly, it will be seen that in the particular embodiment described above, the recycle propane stream is returned to the reaction zone in admixture with the propylene and benzene in the combined feed stream. The recycle propane must therefore be preheated to reaction temperature and if the recycle propane were derived from the depropanizer column as an overhead product stream, the recycle propane would require temperature elevation from 100° F. By the practice of the present invention, however, the propane recycle is at a substantially elevated temperature since it comprises a portion of the hot liquid in line 26 and a portion of the hot liquid in line 40, thus resulting in a reduction of utility expense.

Other advantages in addition to those set fourth hereinabove will be apparent to those skilled in the art.

While the embodiment set forth has been specific to the manufacture of cumene by the inventive process, it must be realized that the present invention is also applicable to the manufacture of other alkylated aromatic hydrocarbons such as ethylbenzene. The inventive process may also be found to be effective in the separation of the effluent from the synthesis of other alkylated aromatic compounds, such as alkylphenols, in the presence of an unreactive diluent.

It must be noted that the rectified flash zone comprising column 4 was maintained at 385° F. and 250 p.s.i.g. in the example given, but that these conditions are specific to the example. The conditions of reflux rate, temperature, and pressure may be adjusted to give the desired separation between liquid and vapor in the effluent. Preferably, these conditions will provide that about half to two thirds of the benzene in the reactor effluent will flash into the vapor phase and that half to one third will remain in the liquid phase. However, the liquid-vapor split may be shifted up or down as desired by choice of the operating conditions, provided that substantially all of the unreactive propane diluent is in the vapor phase and that substantially all of the alkylated benzene remains in the liquid phase. Thus, it is within the scope of the process of the present invention that the rectified vapor in line 5 will contain substantially all of the unreactive propane vapor diluent and that it may contain from about 10% to about 90% of the unreacted benzene, while the flash liquid in line 7 may correspondingly contain from about 90% to about 10% of the benzene and substantially all of the alkylated benzene.

The primary control of the separation of the effluent into liquid and vapor is the amount of pressure drop to which the effluent is subjected upon leaving the reaction zone and entering the flash zone comprising rectified flash column 4. As noted above, it is preferable that the pressure drop, or flashing, should provide that about half to two thirds of the benzene is in the vapor phase and half to one third is in the liquid phase. Although the alkylation reaction may occur at pressures in excess of 1000 p.s.i.g., little or no flashing of vapor would occur at such pressure in the flash zone of column 4, and since the cost of fabricating the vessel for the flash zone would be excessive at such a pressure level, it is advantageous to keep the pressure at about 500 p.s.i.g. or below.

Since the vapor leaving rectified flash column 4 must enter a partial condensing exchanger 21 in order to provide a liquid recycle for return to the reactor at elevated pressure and a vapor feed for the subsequent depropanizer column 29 operating under elevated pressure, it is particularly important not to operate the flash zone at a pressure which is too far below the pressure of these subsequent vessels. Thus, while rectified flash column 4 could be maintained at a pressure in the range of from about 50 p.s.i.g. to 200 p.s.i.g., upon partial condensation of the flash vapor it would be required that the resulting condensate and vapor be pumped into the subsequent processing vessels. Therefore, the pressure within the flash zone should be maintained in the range of from 200 p.s.i.g. to about 500 p.s.i.g., and it is particularly preferable that the pressure be sufficiently high to transfer the vapor via line 27 into the subsequent depropanizer column 29 without mechanical assistance. Thus, it is preferable that the rectified flash column 4 be maintained at a pressure of from about 200 p.s.i.g. to 500 p.s.i.g., and more specifically that the pressure be maintained at from 200 p.s.i.g. to about 300 p.s.i.g. when applied to cumene production.

The temperature within the rectified flash column 4 will be substantially at the flash point of the reactor effluent for the specific reactor effluent composition and for the specific pressure within the flash zone. The temperature will always be below the reactor outlet temperature since the flashing of the effluent will cause a substantially adiabatic temperature drop. Those skilled in the art will realize, however, that the temperature at the top of the rectified flash column 4 will always be below the flash temperature which exists at the bottom of the column below the rectification section since reflux contacts the upflowing vapor before it leaves the top of the column. The temperature within the rectified flash column 4 will, therefore, normally be in the range of from about 250° F. to about 500° F., and will preferably be in the range of from about 300° F. to about 425° F. for cumene production.

The degree of cooling and partial condensation which is imposed upon the rectified flash vapor in heat exchanger 21 will be varied as required to provide the desired degree of phase separation between the propane rich vapor which is subsequently fractionated in depropanizer column 29, and the net hot condensed liquid which is removed from the bottom of receiver 24. In the specific embodiment of the example, the vapor in line 5 was cooled from 366° F. to 259° F. in order to provide the desired degree of separation. This temperature and degree of cooling, however, are specific to this example. The actual temperature which will be necessary within partial condenser 21 and the degree of cooling and condensation therein will depend upon the composition of the vapor which enters the heat exchanger via line 5 and also upon the pressure under which the exchanger is maintained. Since this exchanger is in direct and open communication with the rectified flash column 4, the cooling and partial condensation at heat exchanger 21 will typically occur at a temperature of from about 150° F. to about 500° F. and at a pressure in the range of from about 200 p.s.i.g. to about 500 p.s.i.g. When the inventive process is applied to the separation of cumene pursuant to the preferred embodiment, partial condenser 21 will typically operate at a pressure in the range of from 200 p.s.i.g. to 300 p.s.i.g. and at a temperature in the range from about 150° F. to 400° F.

It should be noted that the foregoing discussion concerning the operating conditons required within the rectified flash zone and partial condensing zone are particularly applicable to the separation of an effluent wherein the subsequent fractionation columns are operated at superatmospheric and atmospheric pressures. It is well known, however, that in alkylating substituted aromatic compounds it is often necessary to fractionate the effluent in a train of columns maintained at subatmospheric pressure. A typical example of such subatmospheric separation is found in the production of butylated hydroxyanisole from the effluent which results in alkylating p-hydroxyanisole with tertiary butyl alcohol. When the rectified flash zone and the partial condensing zone of the present invention precede a subatmospheric fractionation train, they may be maintained at superatmospheric or subatmospheric pressure as may be required to accomplish the particular degree of separation which is desired.

The specific operating conditions which may be required within the rectified flash zone and partial condensing zone of the present invention are readily ascertainable for any given reactor effluent composition by those skilled in the art utilizing the teachings which have been presented hereinabove.

It is to be noted that the fractionation section of the example comprises a depropanizer column and a recycle benzene column. The operating conditions within these fractionation columns are specific for the process set forth in the example, and the operating conditions which may be necessary for any other reactor effluent composition will be readily ascertainable by those skilled in the art. It is not, therefore, necessary within the description of this invention to discuss broad ranges which are required for such fractionation columns or for the cument column which is required in the overall process but which was not shown in the drawing.

It should be noted that in the example set forth a solid phosphoric acid catalyst was used in the reaction zone for alkylation of the aromatic. Since aromatic hydrocarbons leach water and phosphoric acid from such catalyst, provision must therefore be made for removal of concentrated phosphoric acid as indicated via line 6. Where other catalyst systems are used in the inventive process such provision for acid removal from the bottom of the rectified flash column and from the process may not be necessary.

It will be readily seen that the inventive separation process as set forth in the drawing and example above, wherein cumene is recovered from an aromatic-alkylation reactor effluent, is equally applicable to the separation of an effluent from an oligomerization reactor as, for example, in the recovery of propylene-trimer, propylene-tetramer, or heptene fractions. Those skilled in the art will perceive that partially-oligomerized product will be returned to the reaction zone via line 22 and line 26 and line 40 for further reaction with olefin to produce the desired fully oligomerized product in the reaction zone, while the unreactive diluent is returned via line 26 and line 40 to provide the desired thermal quench in the reaction zone. The benefits which accrue to the cumene process by utilization of the inventive separation process are therefore equally realized when applying the present invention to the synthesis of commercial heptene fractions, propylene-trimer, and propylene-tetramer.

From the foregoing discussion, it may now be summarized that a particularly preferred embodiment of the present invention is a process for recovery of alkylated aromatic compound which comprises passing an alkylation effluent comprising unreactive diluent, alkylatable aromatic compound, and alkylated aromatic compound, from an alkylation reaction zone into a rectified flash zone maintained at a pressure in the range of from about 200 p.s.i.g. to about 500 p.s.i.g. and at a temperature in the range of from about 250° F. to about 500° F.; withdrawing from the rectified flash zone a first fraction comprising diluent and alkylatable aromatic compound, and a second fraction comprising alkylatable aromatic compound and alkylated aromatic compound; passing the first fraction into a partial condensing zone maintained at a pressure in the range of from about 200 p.s.i.g. to about 500 p.s.i.g. and at a temperature in the range of from about 150° F. to about 500° F.; withdrawing from the partial condensing zone a third fraction comprising diluent and alkylatable aromatic compound, and a fourth fraction comprising alkylatable aromatic compound; passing the third fraction into a first separation zone maintained under separation conditions; withdrawing from the first separation zone a fourth fraction comprising diluent and a fifth fraction comprising alkylatable aromatic compound; passing the second fraction into a second separation zone maintained under separation conditions; withdrawing from the second separation zone a sixth fraction comprising alkylatable aromatic compound and a seventh fraction comprising alkylated aromatic compound in high concentration; passing the fourth fraction and the fifth fraction into the reaction zone; and recovering the seventh fraction.

The invention claimed:
1. Process for recovery of alkylated aromatic compound which comprises:
   (a) passing an alkylation effluent comprising unreactive diluent, alkylatable aromatic compound, and alkylated aromatic compound, from an aromatic alkylation reaction zone into a vertical flash zone maintained at a pressure in the range of from about 200 p.s.i.g. to about 500 p.s.i.g. and at a temperature in the range of from about 250° F. to about 500 F.;
   (b) separating the effluent in said flash zone into a first vapor fraction comprising diluent and alkylatable aromatic compound and a second liquid fraction comprising alkylatable aromatic compound and alkylated aromatic compound;
   (c) passing said first fraction as vapor from the upper portion of the flash zone into a partial condensing zone maintained at a pressure in the range of from about 200 p.s.i.g. to about 500 p.s.i.g. and at a temperature in the range of from about 150° F. to about 500° F.;
   (d) withdrawing from said partial condensing zone a third fraction comprising diluent and alkylatable aromatic compound ad a fourth fraction comprising alkylatable aromatic compound;
   (e) distilling said third fraction to separate diluent from alkylatable aromatic compound;
   (f) removing said second liquid fraction from the lower portion of the flash zone and separately distilling the same to separate alkylatable aromatic compound from alkylated aromatic compound;
   (g) commingling alkylatable aromatic compound from said steps (e) and (f) and supplying the resultant mixture to said alkylation reaction zone as at least a part of the aromatic reactant therein; and
   (h) withdrawing and recovering the alkylated aromatic compound from said step (f).

2. Process of claim 1 wherein fresh alkylatable aromatic reactant is supplied to step (e).

3. Process of claim 1 wherein alkylatable aromatic compound from step (f) is heat exchanged with first vapor fraction in said partial condensing zone before being commingled with alkylatable aromatic compound from step (e).

4. Process of claim 1 wherein said fourth fraction of step (d) is commingled with said alkylatable aromatic compound from said steps (e) and (f) and the resultant mixture is supplied to said alkylation reaction zone as at least a part of the aromatic reactant therein.

5. Process of claim 1 wherein said alkylatable aromatic compound comprises benzene, said unreactive diluent comprises ethane, and said alkylated aromatic compound comprises ethylbenzene.

6 Process of claim 1 wherein said alkylatable aromatic compound comprises benzene, said unreactive diluent comprises propane, and said alkylated aromatic compound comprises cumene.

References Cited

UNITED STATES PATENTS

| | | | |
|---|---|---|---|
| 2,658,863 | 11/1953 | Guala | 203—88 |
| 2,694,095 | 11/1954 | Medcalf et al. | |
| 2,787,648 | 4/1957 | King. | |
| 2,912,365 | 11/1959 | Irvine | 203—21 |
| 3,046,316 | 7/1962 | Gudelis. | |
| 3,230,155 | 1/1966 | Schurch | 203—26 |
| 3,255,269 | 6/1966 | Gilman et al. | 260—671 |
| 3,350,419 | 10/1967 | Null et al. | 203—87 |
| 3,350,420 | 10/1967 | Fariss | 203—87 |
| 3,404,177 | 10/1968 | Baba et al. | 203—87 |
| 3,408,284 | 10/1968 | Borst | 203—87 |

WILBUR L. BASCOMB, Jr., Primary Examiner

U.S. Cl. X.R.

203—77, 69, 87, 88; 260—671, 674, 683.15

UNITED STATES PATENT OFFICE
CERTIFICATE OF CORRECTION

Patent No. 3,499,826                                                  March 10, 1970

Thomas L. Sulzabch et al.

It is certified that error appears in the above identified patent and that said Letters Patent are hereby corrected as shown below:

In the heading to the printed specification, lines 6 and 7, "(both of 30 Algonquin Road, Des Plaines, Ill. 60016)" should read -- assignors to Universal Oil Products Company, Des Plaines, Ill., a corporation of Delaware --. Column 2, line 32, "obligomerization" should read -- oligomerization --. Column 7, line 1, "rather than being introduced directly" should read -- depropanizer column wherein it --. Column 8, line 14, "recycles" should read -- recycled --; line 52, after "benzene recycle" insert -- is recycled --. Column 10, line 69, "cument" should read -- cumene --. Column 11, line 66, "500 F." should read -- 500° F. --. Column 12, line 13, "ad" should read -- and --.

Signed and sealed this 15th day of December 1970.

(SEAL)
Attest:

EDWARD M.FLETCHER,JR.                                WILLIAM E. SCHUYLER,JR.
Attesting Officer                                       Commissioner of Patents